US011869368B1

(12) United States Patent
Pang et al.

(10) Patent No.: US 11,869,368 B1
(45) Date of Patent: Jan. 9, 2024

(54) SYSTEMS AND METHODS FOR AERIAL VEHICLE MANAGEMENT

(71) Applicant: A&C Technology, Inc, Menlo Park, CA (US)

(72) Inventors: Mingdi Pang, Menlo Park, CA (US); Han Qin, Newport Coast, CA (US)

( * ) Notice: Subject to any disclaimer, the term of this patent is extended or adjusted under 35 U.S.C. 154(b) by 0 days.

(21) Appl. No.: 17/885,084

(22) Filed: Aug. 10, 2022

(51) Int. Cl.
*G08G 5/00* (2006.01)

(52) U.S. Cl.
CPC ......... *G08G 5/0034* (2013.01); *G08G 5/0039* (2013.01); *G08G 5/0073* (2013.01)

(58) Field of Classification Search
None
See application file for complete search history.

(56) References Cited

U.S. PATENT DOCUMENTS

| | | | |
|---|---|---|---|
| 7,925,393 B2 | 4/2011 | Bolt, Jr. et al. | |
| 9,595,190 B2 | 3/2017 | McCrary | |
| 9,671,791 B1 | 6/2017 | Paczan | |
| 10,332,405 B2 | 6/2019 | Kopardekar | |
| 10,571,932 B2 | 2/2020 | DeBitetto et al. | |
| 11,217,106 B2 | 1/2022 | Butler et al. | |
| 11,295,624 B2 | 4/2022 | Chambers et al. | |
| 2018/0045522 A1 | 2/2018 | Aziz | |
| 2019/0340934 A1* | 11/2019 | Villa | G01C 21/20 |

FOREIGN PATENT DOCUMENTS

| | | | |
|---|---|---|---|
| GB | 2595510 | A | 12/2021 |
| KR | 20170080354 | A | 7/2017 |
| WO | 2021046013 | A1 | 3/2021 |

OTHER PUBLICATIONS

Google, Map of a portion of the United States Roadways [online] retrieved on May 3, 2023. Retrieved from the internet. <URL: https://www.google.com/maps/@38.6338766,-82.7499751,6.86z> (Year: 2023).*

Jang, Dae-Sung, et al. "Concepts of airspace structures and system analysis for uas traffic flows for urban areas." AIAA Information Systems-AIAA Infotech@ Aerospace. 2017. 0449.) (Year: 2017).*

Muna, Sabrina Islam, et al. "Air corridors: Concept, design, simulation, and rules of engagement." Sensors 21.22 (2021): 7536 (Year: 2021).*

(Continued)

*Primary Examiner* — Shon G Foley
(74) *Attorney, Agent, or Firm* — CIONCA IP Law P.C.; Marin Cionca

(57) ABSTRACT

Provided herein are systems and methods of managing travel by aerial vehicles on an air roadway system, having: a plurality of roads for travel by the aerial vehicles following routes created by a static route planning model; and a plurality of loop systems designated for entry and exit into areas of interest, having an ascending loop and a descending loop wrapping around each other in a spiral without intersecting, and allowing rotational travel in a vertical direction; wherein the routes are created according to an arrival point and a destination point of a user of an aerial vehicle, and wherein the routes are designed to provide minimal interruptions during travel without intersecting other aerial vehicles on the air roadway system.

19 Claims, 10 Drawing Sheets

(56) References Cited

OTHER PUBLICATIONS

Urban Air Mobility and Advanced Air Mobility, Website, https://www.faa.gov/uas/advanced_operations/urban_air_mobility.

UAM Concept of Operations, PDF, Website, https://nari.arc.nasa.gov/sites/default/files/attachments/UAM_ConOps_v1.0.pdf, Jun. 26, 2020, U.S. Department of Transportation, Washington, DC.

International Search Report of the Patent Cooperation Treaty, dated Sep. 25, 2023.

Written Opinion of the International Searching Authority, dated Sep. 25, 2023.

* cited by examiner

SYSTEMS AND METHODS FOR AERIAL VEHICLE MANAGEMENT

BACKGROUND OF INVENTION

1. Field of the Invention

The invention relates generally to transportation systems, and more specifically to air roadway transportation management systems and methods.

2. Description of the Related Art

As more and more vehicles are produced and put into use with the continuous advancement of production technology, more and more cities are having serious traffic problems due to capacity issues. Although many cities have developed public transportation to alleviate traffic problems, the results are not satisfactory and traffic congestion is still serious. As people's economic situations improve, more vehicles will be needed, and then the pressure on traffic will increase further. Flying cars will be the key to solve this problem. The application of air transportation will greatly alleviate the current ground transportation problems and improve commuting efficiency to reduce the time of travel. When the use of flying cars is gradually applied, then correspondingly, the implementation and management of air highway systems will also be essential.

Existing air highways are set up for long-distance flying aircraft, and these highways have low capacities and are too far from the ground to be suitable for use by flying cars. Use of air roadways for flying cars would also require route planning methods such that multiple aircrafts could make use of the roadways while avoiding flight conflicts. Re-planning functions would also be needed in the air roadway system, such that when an aircraft decides to change its route or destination, it can reroute in real time while ensuring that the new route does not affect or conflict with the routes of other aircraft.

Further, route planning systems are not yet standardized or set in place for flying cars, and as such, as flying cars become implemented for general or public use, there would be many safety hazards if they fly freely.

Route planning is an unavoidable problem in traditional air traffic control systems. The route planning method determines the efficiency of the Air Traffic Control system. The dynamic planning approach eliminates the route planning process and allows individual aircraft to each plan its own route. An aircraft's route is from a straight line between the takeoff position and the landing destination. But free flight can also cause several problems, including aircraft conflicts and lack of oversight.

Generally, in existing Air Traffic Control systems, the implementation of dynamic planning can often be difficult due to outdated facilities and communication technologies, as well as various inadequacies of regulatory models. In a dynamic planning model, Air Traffic Control cannot effectively manage all flying aircraft. First, since each aircraft is free to decide its flight path in this mode, the Air Traffic Control system may not be able to receive flight information of each aircraft in real time, making it difficult to intercept and monitor illegal flights. Secondly, the flight information of each aircraft cannot be transmitted to the air traffic control system in real time, which brings great security risks to the Air Traffic Control system for controlling the aircraft in real time. Finally, in dynamic planning model, each vehicle is free to generate routes to fly, which leads to route conflicts with other vehicles, and conflicts with fixed-route conflict elimination strategies.

In a static route planning model, the individual vehicles must not plan their own route. Thus, efficient route planning is the key to the static planning system. Route planning in a static route planning model is a multi-aircraft, multi-constraint optimization problem. The data imported by the route planning model includes the current flight requests and flight reports for each vehicle. The information in each flight request includes flight altitude, takeoff position, desired takeoff time, and landing position. This is a large-scale management system that is not currently in use for a flying vehicle transportation network.

These and other related issues have not yet been addressed or implemented by existing systems. Therefore, there is a need for a solution to the problems described above.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

Provided herein are systems and methods for management of air static highways for flying cars. Generally, static flight paths for flying cars are provided such that the flying cars can travel in a given direction without intersecting with other flying cars and arrive directly at a desired destination. The air roadways provided herein provide management systems for avoiding collisions and other hazards.

Over time, the air traffic control system has been unable to adapt to the new social needs. The concept of urban air mobility, which was developed in the last century to address the rapid growth of civil aviation passenger traffic, is considered the most likely future model of Air Traffic Control systems because it provides the following features that are not available in the current centralized air traffic control system: 1) each vehicle is free to choose its own takeoff and landing location; 2) each vehicle is free to plan its route with minimum flight time; 3) in-flight aircraft follow fixed routes to avoid intersections. Generally, the air roadways provided herein can provide a management system to enable these features while reducing risk of collisions and increasing safety.

Provided herein are static planning models, which are extensions of the concept of dynamic planning models. Such models can improve airspace security and communication with each aircraft while implementing air route planning functions. Unlike basic dynamic planning, in a static planning model, the air traffic control system receives information from all aircraft to plan a fixed route, and then develops an overall flight plan, such that multi-aircraft route planning is the most important part of the system.

Provided herein are multi-aircraft collaborative route planning methods based on static route setting planning. These methods can help to solve difficulties of route planning of multiple aircraft. The method achieves the route planning of multiple aircraft while avoiding flight conflicts, and further provides the route re-planning function, i.e., rerouting; when an aircraft decides to change its destination, it can re-plan its route in real time, while ensuring that the new route does not affect the routes of other aircraft.

In some embodiments, air roadway systems are provided having roads for travel in at least the four cardinal (north, south, east, west) directions, wherein each roadway allows travel in only a single direction. In some embodiments, turning lanes are provided to allow access from one unidirectional roadway to a second unidirectional roadway for travel in a different direction. In some embodiments, roadways are divided into upper and lower levels, such that the upper level allows travel in one direction and the lower level allows travel in the opposite direction.

In some embodiments, air roadway systems are providing having loop systems for entry and exit into large city centers, other populated areas, or other areas of interest. In some embodiments, the loop systems comprise at least two loops for travel in travel in a circular motion, wherein the two loops wrap around each other but do not intersect each other, such that travel along the first loop allows travel in a first ascending direction and travel along the second loop allows travel in a second descending direction. In some embodiments, traveling in the ascending loop allows for travel out of a city center, and out of the loop system to connect to other areas of the air roadway system, and traveling in the descending loop allows for travel from sections of the air roadway system into a city center.

In some embodiments, provided herein are methods of managing travel by aerial vehicles on an air roadway system, comprising: designing the air roadway system, comprising a plurality of roads arranged in a grid, such that a first set of roads is arranged perpendicular to a second set of roads, and wherein each road comprises an upper level allowing travel by the aerial vehicles in a first direction, and a lower level allowing travel in a second direction opposite to the first direction; providing a static route planning model for creating routes for individual aerial vehicles, wherein the routes are created according to an arrival point and a destination point of a user of an aerial vehicle; determining the routes for the individual aerial vehicles such that the routes are designed to provide minimal interruptions during travel without intersecting other aerial vehicles on the air roadway system; designating the air roadway system for use by travel according to the routes created by the static route planning model; providing the routes to the aerial vehicles traveling on the air roadway system; and monitoring the air roadway system to re-plan the routes or perform road closure in case of emergencies or severe weather conditions; wherein turnpikes connect the first set of roads to the second set of roads to allow travel between the first set of roads and the second set of roads; and wherein turning lanes connect the upper level and the lower level of each road to allow travel between the upper level and the lower level In some embodiments, provided herein are air roadway systems for use by aerial vehicles, comprising: a plurality of roads designated for travel by the aerial vehicles following routes created by a static route planning model, wherein the plurality of roads is arranged in a grid, such that a first set of roads is arranged perpendicular to a second set of roads, and wherein each road comprises an upper level allowing travel by the aerial vehicles in a first direction, and a lower level allowing travel in a second direction that is opposite to the first direction; and a plurality of loop systems designated for entry and exit into areas of interest, comprising an ascending loop and a descending loop, wherein the ascending loop and the descending loop wrap around each other in a spiral without intersecting, and allow rotational travel in a vertical direction, and wherein the ascending loop and the descending loop each comprise entry points and exit points at a ground level, at least a center level, and a top level, wherein the entry points and exit points of the at least a center level and the top level allow access to the plurality of roads and the entry points and exit points of the ground level allow access to the areas of interest; wherein turnpikes connect the first set of roads to the second set of roads to allow travel between the first set of roads and the second set of roads; and wherein turning lanes connect the upper level and the lower level of each road to allow travel between the upper level and the lower level; and wherein the routes are created according to an arrival point and a destination point of a user of an aerial vehicle, and wherein the routes are designed to provide minimal interruptions during travel without intersecting other aerial vehicles on the air roadway system.

In some embodiments, provided herein are methods for enabling take-off and landing of aerial vehicles on an air roadway system, comprising: providing a static route planning model for creating routes for individual aerial vehicles, wherein the routes are created according to an arrival point and a destination point of a user of an aerial vehicle; determining the routes for the individual aerial vehicles that are designed to provide minimal interruptions during travel without intersecting other aerial vehicles on the air roadway system; providing the routes to the aerial vehicles traveling on the air roadway system; providing a loop system designated for entry and exit into an area of interest by the aerial vehicles, the loop system comprising an ascending loop allowing travel in an upwards direction, and a descending loop allowing travel in a downwards direction; wherein the ascending loop and the descending loop are arranged in a spiral wrapping around each other without intersecting each other; wherein the ascending loop and the descending loop each comprise entry points and exit points at a ground level, at least a center level, and a top level, wherein the entry points and the exit points of the at least a center level and the top level allow access to the plurality of roads and the entry points and the exit points of the ground level allow access to the area of interest; allowing landing of the aerial vehicles on the ground level within the descending loop; and allowing take-off of the aerial vehicles on the ground level within the ascending loop.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
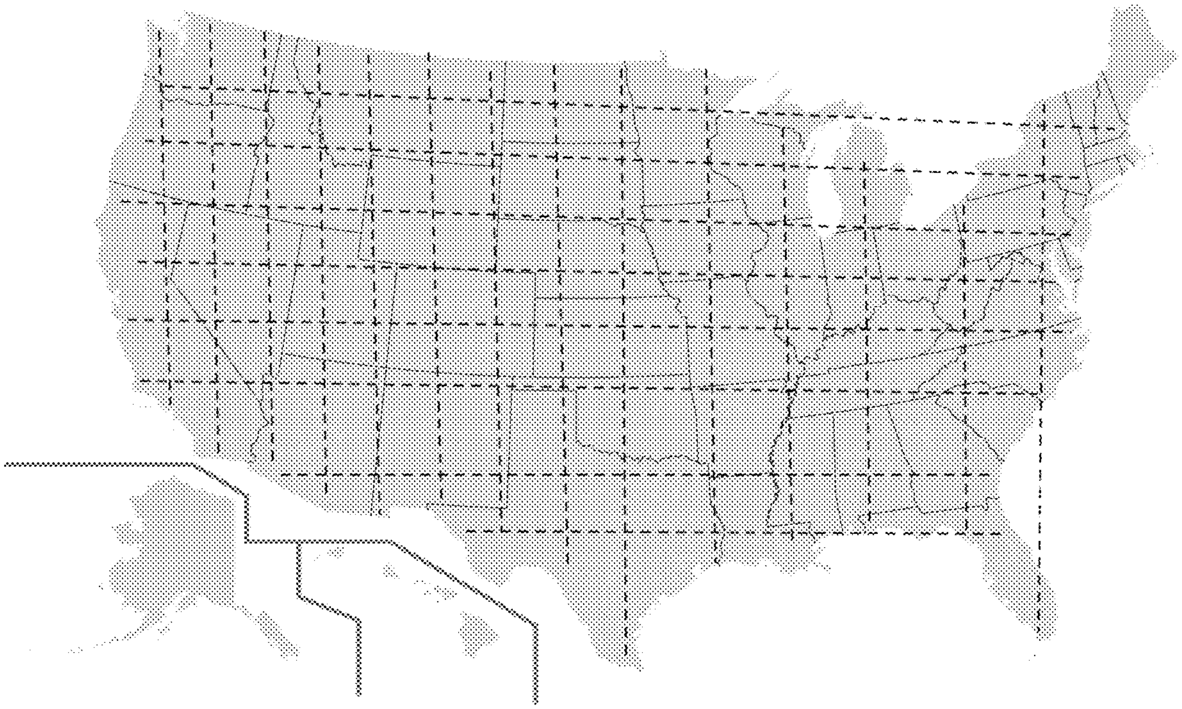
FIG. 1 depicts a general schematic of an air highway system connecting various parts of the United States, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

FIG. 1 depicts a general schematic of an air highway system connecting various parts of the United States, according to an aspect. Generally, the air roads ("roads," "roadways," or "air roadways") of an air highway system may be used for travel across long and short distances, such as existing ground transportation roads, and these air roadways may be interconnected within the air highway system. As shown as an example in FIG. 1, the system may be provided in a grid pattern layout. The roads are indicated by dashed lines 101, which represent aerial 3D roads. It should be understood that the aerial roadways discussed herein are routes for use in the air and therefore, generally do not typically comprise structural elements, and it should further be understood that the schematic diagrams provided in the figures show representations of the roadways to be used by aerial vehicles. Generally, the roadways are implemented in a fixed location by the air highway system. Representations of the roadways may be visible through maps, mobile devices, or any other suitable technology. Navigation on the air roadway system may therefore by assisted by such technology, GPS, and so on.

Again, these roadways are implemented for use by aerial vehicles. The aerial vehicles may be vertical take-off and landing (VTOL) vehicles, helicopters, drones, and so on. However, it should be understood that the air highway systems provided herein may be used for any suitable vehicles, which are referred to herein as "aerial vehicles" or "flying cars."

Provided herein are methods for using the air highway system with static routes. In a static route mode, routes are generally not changed after the initial design, and the flying car travels according to the road plan. Routes can be reused, with only one flying car per road at a time in the same segment. Segments are described in further detail herein when referring to FIG. 5B. In some embodiments, air highway systems using dynamic route models are provided.

Generally, the air highway systems provided herein provide airborne static highways connecting states, counties, and cities throughout the United States and other countries. Loops (described in further detail herein when referring to FIGS. 2-4B) may be provided in cities and other populated areas or areas of interest for providing access to different layers of the highway system and directions of travel. These loops connect the main roads in the cities, through which the flying car can reach the main roads of the city and then reach its destination directly through feeder roads connected to main roads. The flying car can travel through the roads without traffic lights and without intersecting with flying cars traveling in other directions and can reach its destination directly without stopping during its route.

Provided herein are methods for planning air roadway systems comprising ring roads, highways, and city roads. When all such roads are connected, a static air road system can be formed all over the United States, such as the example shown in FIG. 1. Flying cars can choose different roads according to their destinations, and the roads can be divided into one-way five lanes, one-way ten lanes, one-way twenty lanes, and so on, depending on the amount of demand, the size of the city, and the area of air flight available. Accordingly, roads can be divided according to the traffic demands and air capacities of the city to be planned using the air roadway system management methods provided herein. Additionally, the number of lanes per roadway can be determined according to the traffic demands and air capacities of the city area.

Provided herein are air highway systems using static route planning models, wherein the planned routes are connected by loops to ensure smooth operation of the roads by aerial vehicles. When the static road is planned, the roadways do not change, but it should be understood that the roadways could be changed in special circumstances, such as, but not limited to, increased demand, city expansions, and so on. Generally, through use of static route planning models, aerial vehicles can fly in an orderly manner in strict accordance with the road plans provided to each vehicle and do not fly freely at will accordingly to their own route planning methods. In some embodiments, the static route planning model route creation is performed by a computer system, e.g., a computer system programmed to perform the functions disclosed herein, such as, but not limited to, re-planning routes or performing road closures in the case of emergencies or severe weather. Such systems may be referred to as management systems of the air roadway systems provided herein. In some embodiments, the management system for monitoring the air roadways are capable of creating the routes and making adjustments to the routes created by the static route planning model, and performing road closures in the case of emergencies or severe weather conditions.

Generally, the routes created by the static route planning model are designed to minimize interruptions to travel and minimize delays, and without intersecting other aerial vehicles on the air roadway system. Routes are created with the aim of providing each aerial vehicle on the air roadway system with a flight plan having a minimum flight distance, minimum flight time, and without intersecting other aerial vehicles. Considerations when creating a route may include, but are not limited to, road occupancy, traffic congestion, weather, and so on. The routes are created before an aerial vehicle takes off, and the shortest and least occupied lanes are assigned to aerial vehicles. These assignments may, for example, be performed in a "first come first served" method. If the route determined to be the optimal route for an individual aerial vehicle has congestion or unexpected conditions that limits the use of the selected roads (such as, for example, accidents or bad weather), the second optimal route will be assigned to the vehicle. Other considerations may be the need for refueling or charging of the aerial vehicle when long travel such as cross-country travel is needed. Generally, when accidents, severe weather, or any other situation requires re-planning of a route for an aerial vehicle, the most efficient and optimal route will be planned for the vehicle and reassigned to the vehicle. Again as discussed above, such re-planning and assigning of routes may be performed by a navigation system, computer program, and so on.

Referring again to FIG. 1, the air highway systems provided herein can form a grid pattern. Within the grid, loops and roadways can be distributed over the U.S. to ensure that each state, county, and city is connected, and that each connected region can be reached on demand. In the event of severe weather or any other emergency situation, air highways in the affected area may be closed and air traffic management may issue notices to those that are impacted. When the area is affected by severe weather such as tsunamis, hurricanes, and so on, the air highways in adjacent areas may be closed and a notice will be issued to close the area to avoid unnecessary damage.

Flying in the air is always inevitably affected by the weather. Once there is bad weather, the flight of the flying car will certainly be affected. Air traffic management agencies should always pay attention to the weather conditions, if there are high winds, heavy rain and other weather affecting flying cars, they may take action to close the road entrances and exits according to the affected routes in time to avoid accidents. In case of extreme bad weather, the roads in the whole area may be closed and measure may be taken to ensure that all the flying cars that pass through the area are detoured. When there is large-scale severe weather affecting a large area, all air road facilities in the affected area should be stopped and the use of air roads by flying cars should be prohibited to avoid danger. Generally, air traffic management agencies may monitor weather conditions and release the road conditions regularly daily so that users are informed if their routes within the air highway systems provided herein are affected.

Figure 2:
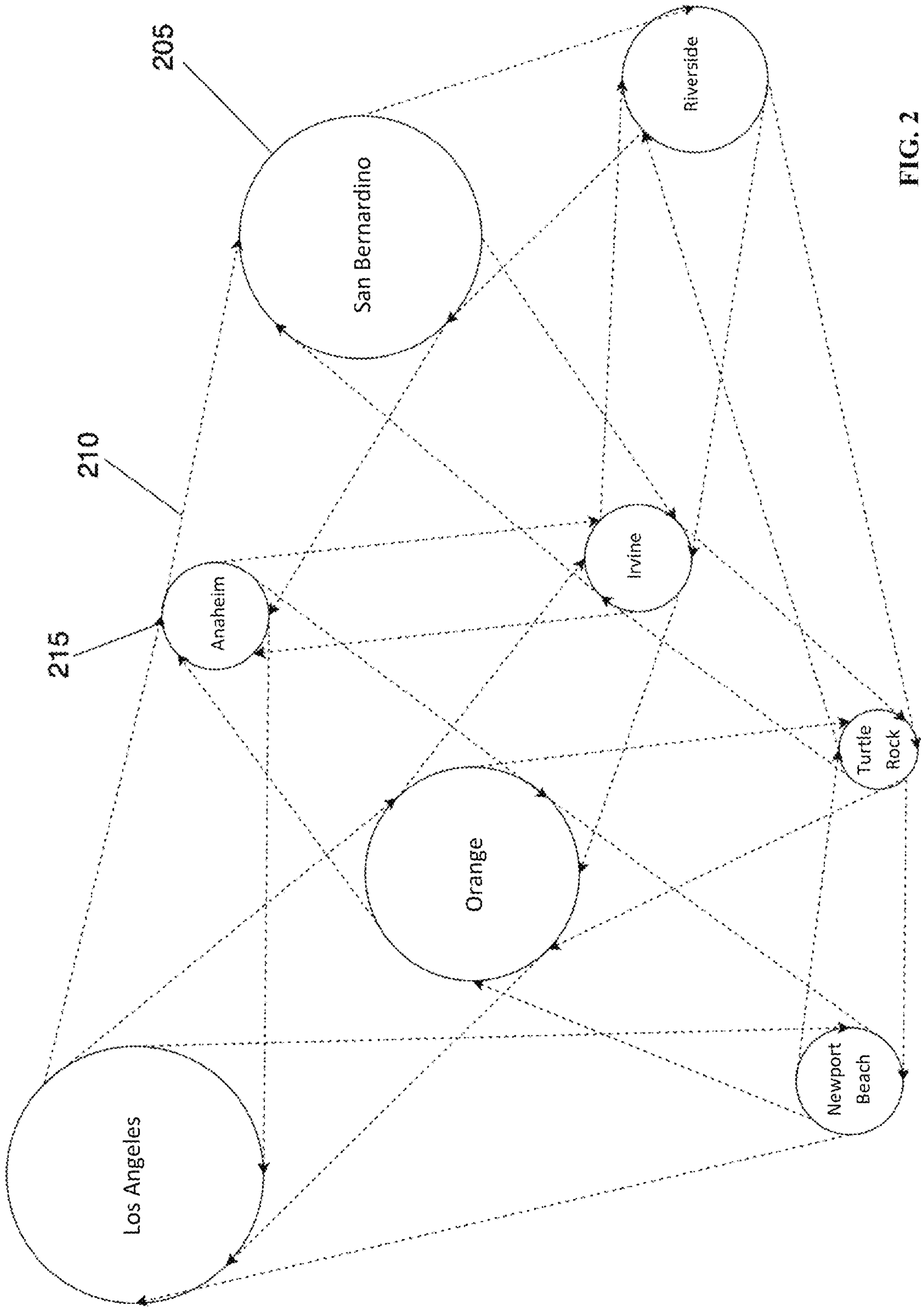
FIG. 2 depicts a schematic diagram of interconnected aerial loop systems 202, shown connecting Los Angeles, California and surrounding nearby areas, according to an aspect.

FIG. 2 depicts a schematic diagram of interconnected aerial loop systems 202, shown connecting Los Angeles, California and surrounding nearby areas, according to an aspect. When the grid map depicted in FIG. 1 is enlarged to a specific part of the county or city, it may be composed of different sized loops and highways as depicted in FIG. 2. Generally, cities and neighboring areas may make use of such air loop systems. Each area may utilize an air loop system 202 comprising several loops 205 ("air loops," "aerial loops," or "loops"), wherein each loop 205 services a major city area and connects it to other areas. For example, San Bernardino may use a loop system 205 which enables aerial vehicles to travel to the loop system 205*a* utilized by Riverside.

Loop systems can be provided within the system according to counties and cities, and in the case of areas with dense cities and little traffic demand, a loop 205 can be shared by multiple cities. Alternatively, multiple loop systems can be provided according to higher demand. The size of the loop systems varies depending on the size of the county and city. Not all counties or cities have direct roads between them, and many times it may be necessary to pass through other counties or cities by utilizing ring roads (discussed in further detail below). Larger counties or cities can have larger loop systems, thus connecting more other counties or cities, while smaller counties or cities will have smaller loops laid out and, for route planning efficiency, may be provided with the ability to only connect to the loops of nearby counties or cities that directly border them. This may help to avoid road crossings for higher efficiency of route planning.

Generally, when the loop system is utilized, two main types of air roadways are provided: interconnecting ring roads 210, and intra-loop ring roads 215. Interconnecting ring roads 210 may be provided to connect loops with other loops or roads. These can allow access to other parts of the air roadway system from any given location. Intra-loop ring roads 215 allow travel within city centers via various levels provided within the city. It should be understood that these intra-loop ring roads 215 may also be used in any suitable area of interest which may or may not be cities. For example, the same systems and methods used for layered intra-loop ring roads, which are discussed in further detail herein, may be used in rural or non-populated areas or any other area that the air roadway system services as needed.

In the case of flying cars that require runway taxiing for takeoff and landing, they can also follow the road into and out of the intra-loop ring roads 215 and may utilize interconnecting ring roads 210 if necessary, before or after taxiing for takeoff and landing. This may include utilizing parts of the roads that can intersects with and connect to the ground.

Generally, through use of the aerial loops, aerial vehicles can use various entry and exit points at different heights or levels as needed. Through the aerial loops 205, an aerial vehicle can adjust its flight altitude, such that it can enter a road at another altitude that is intended for traveling in a different direction than the one the aerial vehicle was originally traveling in. An aerial vehicle can also enter the loop from the air roadways and land through the loop to enter city roads, for example. These methods are discussed in further detail herein.

Figure 3:
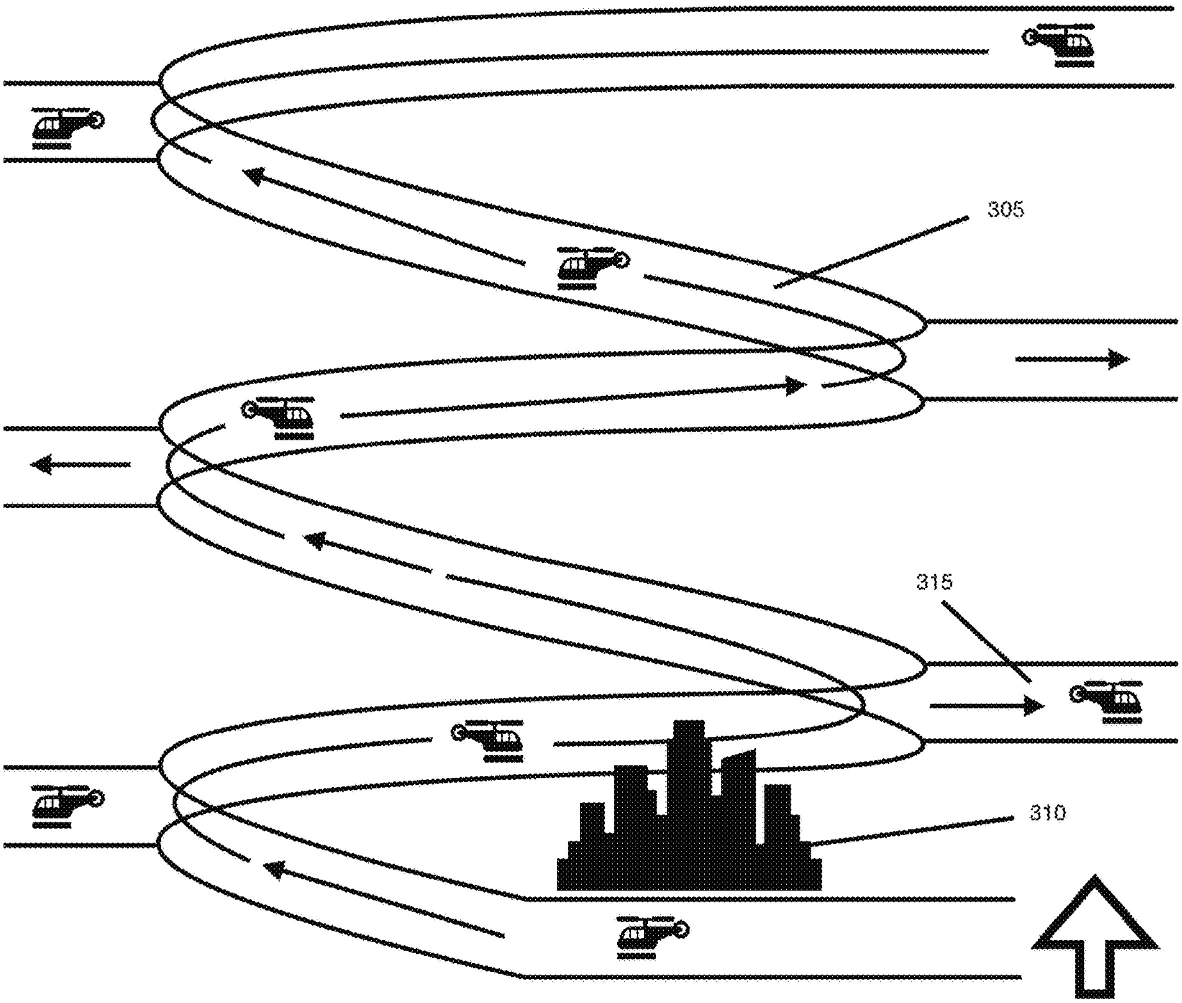
FIG. 3 depicts a side view of a schematic diagram of a portion of an aerial loop system 305 for use by a city 320, according to an aspect.

FIG. 3 depicts a side view of a schematic diagram of a portion of an aerial loop system 305 ("aerial loop system," "aerial loop") for use by a city 320, according to an aspect. Each city-centered loop system 305 (as shown in FIG. 2, wherein each city-centered loop 205, 205*a* services a designated area) may comprise an ascending loop and a descending loop. FIG. 3, for visual clarity, depicts only the ascending loop, showing multiple entry and exit points at different altitudes to allow an aerial vehicle 318 to connect to other sections of the air highway system. Within the ascending loop, an aerial vehicle can take off and land, and may use boosts for take-off and landing if necessary, via a portion of the loop system 305 that intersects with and connects to the ground 319. The aerial vehicle may enter or leave the loop system 305 during the takeoff climb and landing as shown by the various exit points 317.

After entering the loop system 305, aerial vehicles can enter other highways of the air roadway system using the various exits 317 according to their needs. Due to the size of large cities and the capacity and flow of flying cars, the loop in large cities will occupy more space, while the central area of the loop system 305 will not be affected by the takeoff and landing of the flying cars. These loop systems may be set up at city facilities such as plazas, commercial centers, and so on, as needed.

Again, a single loop system 305 for a city center or other area of interest 320 may comprise multiple exit points as indicated by arrows 317. These may be provided at various altitudes and connect to other air roadways in different directions. Aerial vehicles 318 may enter these loop systems from entry points or may exit the loops at different exit points in different directions depending on their destination.

As discussed above, each city-centered loop system 305 may be provided with an entry loop (also referred to as a descending loop) and an exit loop (also referred to as an ascending loop). These may provide travel in different directions, and each ascending and descending loop may be unidirectional. For example, in some embodiments, the entry loop allows clockwise rotation, in the direction of the freeway into the city, and the exit loop that allows counter-clockwise rotation out of the city into the direction of the freeway. In some embodiments, the entry loop allows counterclockwise rotation, and the exit loop allows clockwise rotation.

In some embodiments, each ascending and descending loop comprises an exit or entrance at a semi-circle portion of the loop system that connects to the remaining sections of the air roadway system, and provides access to other freeways. Ascending and descending loops can be set at different heights and altitudes (also referred to as levels) depending on the size of the city or county, to accommodate the needs of different cities for roads. In some embodiments, the levels of the loops may be adjusted, rather than being fixed, to accommodate demand or other reasons.

Figure 4A:
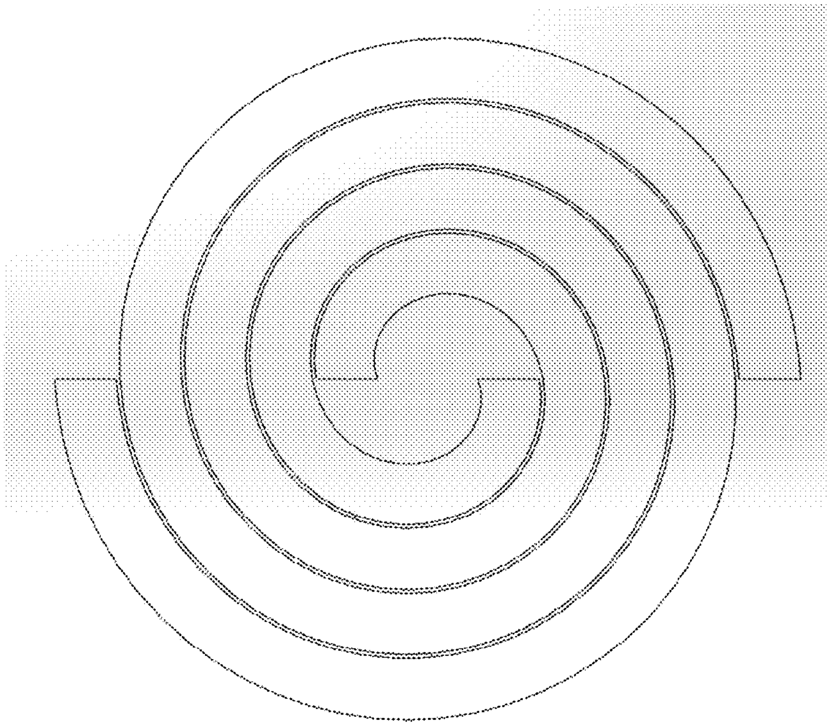
FIGS. 4A-4B depict a top and side view, respectively, of a loop 405 schematic diagram, according to an aspect.
Figure 4B:
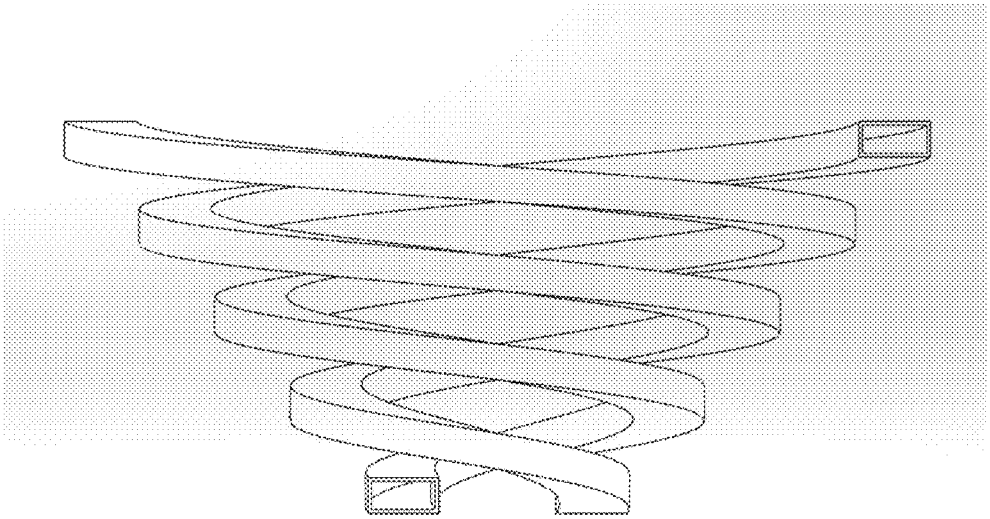

FIGS. 4A-4B depict a top and side view, respectively, of a schematic diagram of an aerial loop system 405, according to an aspect. As discussed above, each loop system 405 may comprise an ascending loop, also referred to as a first loop **422*a*, and a descending loop, also referred to as a second loop 422*b*. These loops within the loop system 405 are non-intersecting, and each may allow vehicles access to the other, via intersections at different levels. Each loop may allow travel in only a single direction, starting at the ground level 419. From the ground level 419, the two loops may be adjacent and wrap around each other as shown in FIG. 4B until the uppermost level of the loop system 421 ("uppermost level," "top level"). At the top level 421**, the aerial vehicles traveling on the loops may then connect to other portions of the air roadway system.

Generally, the loop system 405 may be provided with four tiers or levels. These may be the top level 421, two middle levels 423, and a lower level 424 which may be above the ground level 419. It should be understood that according to demand or any other reasons, the loop systems 405 may be designed to be taller or longer to accommodate more levels to connect to more sections of the air roadway system. In some embodiments, the loop systems have four levels, wherein each of the four levels connect to four main city roadways in the cardinal directions.

Figure 5A:
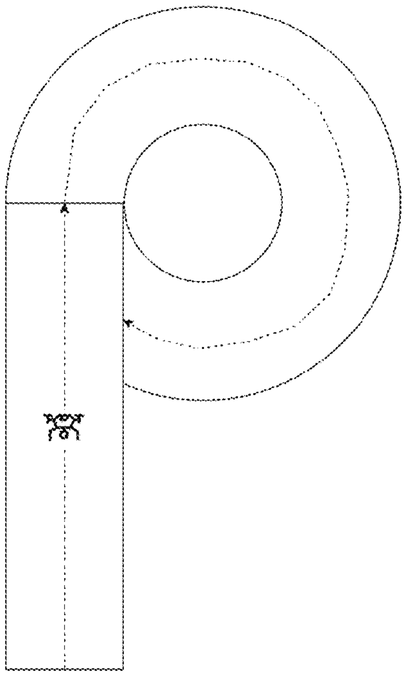
FIG. 5A depicts a top view of an aerial vehicle 518 entering a loop system 505 via a roadway 504 at an entry point 525 of the loop system, according to an aspect.

FIG. 5A depicts a top view of an aerial vehicle 518 entering a loop system 505 via a roadway 504 at an entry point 525 of the loop system, according to an aspect. The aerial vehicle 518 can then continue following the loop in the direction indicated by arrows 511.

Figure 5B:
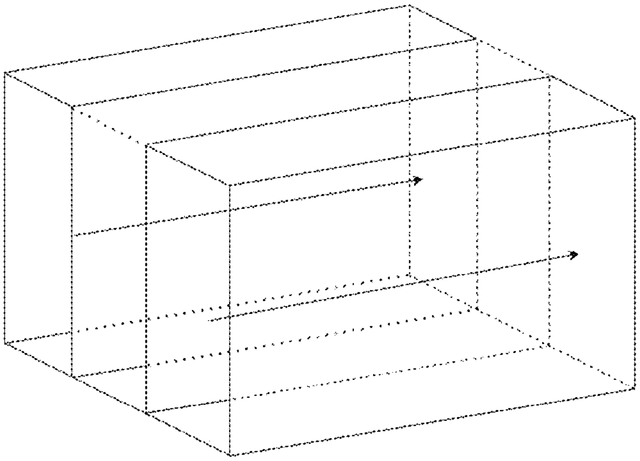
FIG. 5B depicts a side perspective view of a schematic diagram of a square segment 513 of an air roadway, according to an aspect.

FIG. 5B depicts a side perspective view of a schematic diagram of a square segment 513 of an air roadway, according to an aspect. The roadway may be made up of a plurality of such individual squares 513, with each square having lanes. As an example, each square 513 may comprise three lanes **512*a*, 512*b*, 512*c***. As an example, each square may be approximately 165 feet by 165 feet by 165 feet to provide the aerial vehicles traveling on the air roadway with sufficient room to drive safely and maintain a safe distance from the flying cars driving in other adjacent lanes.

As described above as an example, the roadway square 513 may comprise three lanes. Two lanes **512*a*, 512*c* may be designated for travel in a first direction as indicated by arrows 514, and the center lane 512*b* may be designated as a barrier lane between lanes 512*a* and 512*c*, acting as a buffer area for aerial vehicles. In some embodiments, the barrier lane 512*b*** may be utilized by aerial vehicles that need to change or merge into other lanes, for example.

In some embodiments, segments of the roadway may be provided with more than three lanes. In such embodiments, additional barrier lanes may be provided in between the lanes designated for travel by aerial vehicles. In some embodiments, an emergency lane (not shown) may be provided underneath each lane, which can be used to pass quickly or avoid accidents in case of sudden emergencies.

Figure 6:
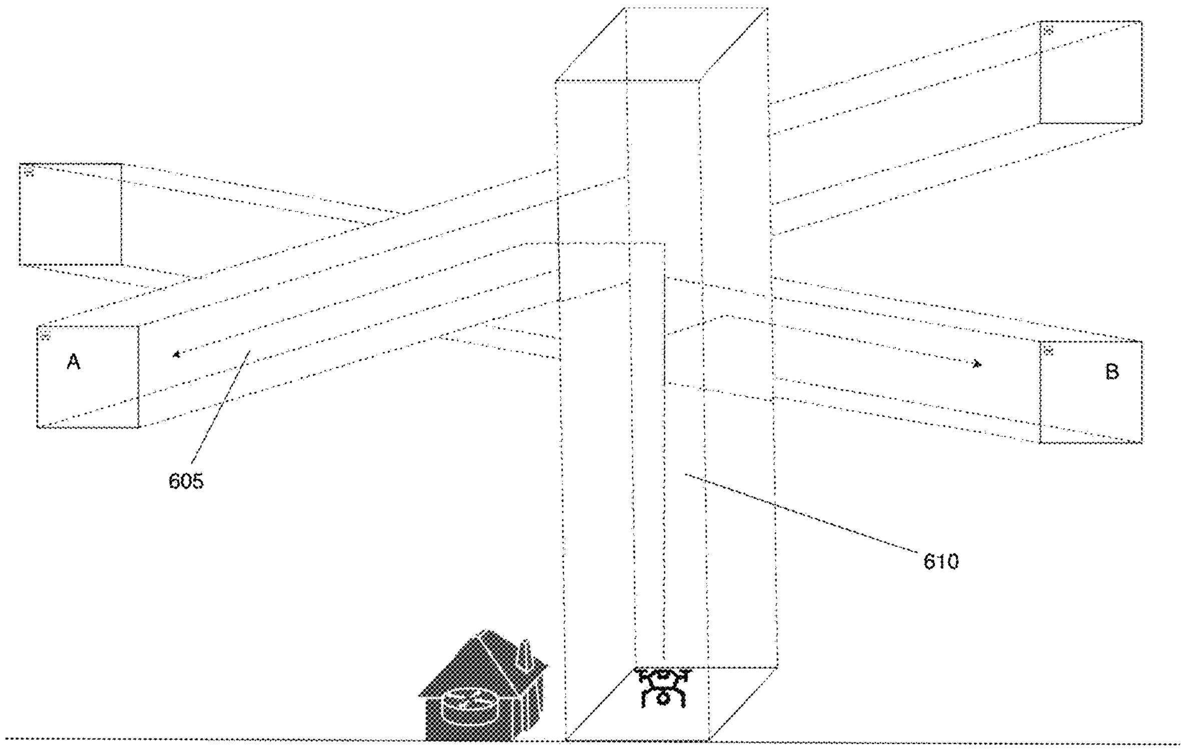
FIG. 6 depicts a side view of a schematic diagram of a take-off and landing area 616, according to an aspect.

FIG. 6 depicts a schematic diagram of a take-off and landing area 616, according to an aspect. In some embodiments, the take-off and landing areas ("take-off and landing area," "landing area," or "take-off area,") 616 are used by individual aerial vehicles 618. In some embodiments, such landing areas may be used by aerial vehicles that are capable of vertical take-off and landing ("VTOL" or "VTOL" vehicles"). In some embodiments, individual residences 628 are provided with a landing area 616. It should be understood that the take-off and landing areas 616 provided herein can be used for any suitable place, such as individual residences, shared residences, public spaces, and so on.

In some embodiments, a landing pad 626 is provided, wherein the aerial vehicle 618 can take off from, and land on top of and park. A vertical column 627 is provided for each landing area, within which the aerial vehicle 618 can move up and down vertically. The vertical column 627 may be connected to roadways via access roads **629*a*, 629*b*, which may provide access the intra-loop ring roads, for example. In some embodiments, each vertical column 627** is provided access to intra-loop ring roads that travel in the four cardinal directions of north, south, east, and west.

The aerial vehicle 618 may take off vertically from the landing pad 626 and travel in the direction indicated by arrow 630 within access road **629*a*, which would then allow access to an intra-loop ring road traveling west, for example. Alternatively, the aerial vehicle 618 may take off vertically, and travel in the direction indicated by arrow 631 within access road 629*b*, which would then allow access to an intra-loop ring road traveling south, for example. Generally, access road 629*a* may also allow travel in the direction opposite to arrow 630, to travel east, and access road 629*b* may also allow travel in the direction opposite to arrow 631, to travel north. The aerial vehicle 618 may also use the vertical column 627 to travel downwards and return to the residence 628**.

Figure 7:
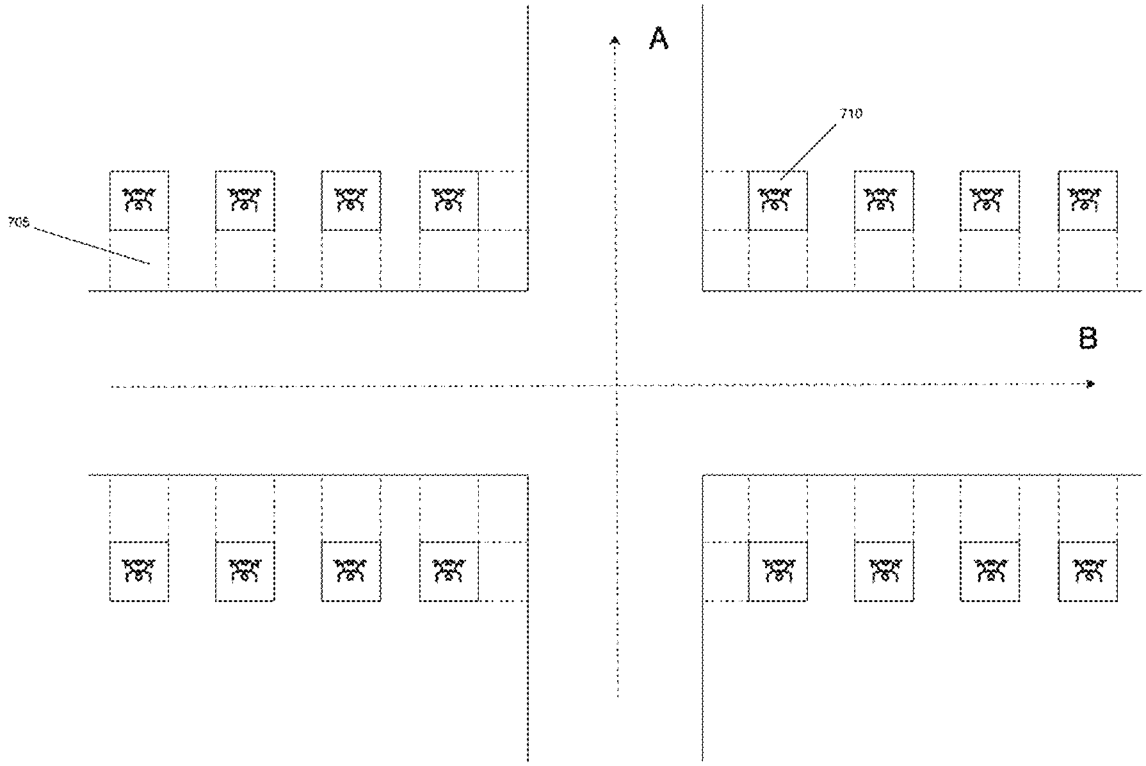
FIG. 7 depicts a top view of a schematic diagram for landing areas 716 of an air highway system, which may be used in residential areas, according to an aspect.

FIG. 7 depicts a top view of a schematic diagram for landing areas 716 of an air highway system, which may be used in residential areas, according to an aspect. It should be understood that the landing areas 716 disclosed herein may also be used in any suitable non-residential areas such as public spaces.

As shown in the schematic diagram of FIG. 7, spaces with multiple residences (not shown) may provide each residence with a landing area 716. Each landing area 716 may be provided with access roads 729 to allow aerial vehicles 718 to travel from the landing areas to air roadways. In some embodiments, an individual landing 716 is connected to two access roads 729 due to being adjacent to two air roadways, as shown by landing area 716*a*. As shown, the air roadways accessible by the access roads 729 may be intra-loop ring roads 715 which may be used to travel in the cardinal directions. For example, the direction indicated by arrow A may be north, and the direction indicated by arrow B may be east. The intra-loop ring roads 715 may also allow travel in the directions opposite to arrows A and B to travel west and south.

Generally, the layout of the landing areas 716 disclosed herein and depicted in FIG. 7 is provided such that the passage of each aerial vehicle 718 from their landing areas 716 and to the intra-loop ring roads 715 do not intersect with each other and multiple aerial vehicles taking off or landing at the same time may be accommodated.

Flight paths determined using the static route planning models provided herein may be adjusted according to the local car traffic to ensure that there will not be more cars taking off at the same time than the capacity to enter the flight path. If there is a rapid increase or decrease in vehicle traffic in the area, flight paths may be adjusted to accommodate the amount of traffic by adding or subtracting lanes.

Figure 8:
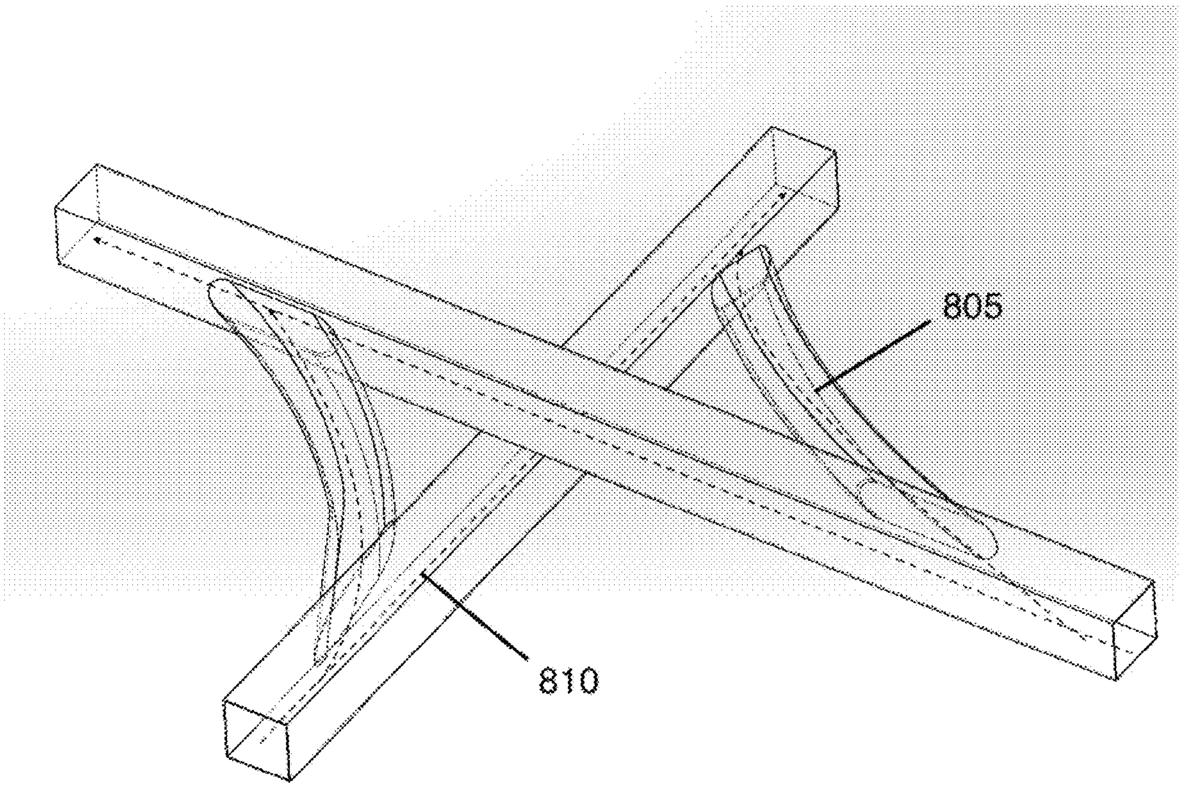
FIG. 8 depicts a top perspective view of a schematic diagram of a section of an air roadway system having at least two roads 815, according to an aspect.

FIG. 8 depicts a top perspective view of a schematic diagram of a section of an air roadway system having at least two roads 815, according to an aspect. In some embodiments, the air roadway system comprises multiple levels, such that each level accommodates travel in one direction. In some embodiments, each road comprises levels (discussed in more detail when referring to FIG. 9), wherein each level is approximately 165 feet high and approximately 165 feet wide, and is divided into four directions: east, west, north, and south. The flying cars traveling in each direction do not intersect with each other, ensuring a smooth flow of vehicles traveling in each direction, without worrying about converging cars or vehicles traveling in other directions. The lanes can change lanes via turning lanes 831 ("turning lanes," or "turn lanes"), to achieve the purpose of switching roads and changing directions. The process of turning does not need to intersect with other flying cars and can quickly and safely make changes into other directions.

The roads provided in the air highway system are divided into four directions: south, east, north and west, and the arrangement sequence is staggered with eastbound lanes, northbound lanes, westbound lanes, and southbound lanes. Each lane can only provide a single direction of travel and cannot be reversed or travel in any other direction. The two staggered adjacent lanes are connected by turn lanes 831, thus linking the two roadways 815 as shown for the purpose of changing direction of travel. The outermost lane of the flight path is set up as a turn-in lane, through which the flying cars will merge into other lanes after turning in, so that the smooth flow of the turn-in lane will not affect the use of other flying cars that need to turn.

Generally, each road 815 as depicted in FIG. 8 may comprise multiple levels. The levels are shown in further detail in FIG. 9, and each road is depicted as a single schematic rectangle in FIG. 8 for visual clarity. However, it should be understood that each road 815 may be further divided into levels, in order to allow travel in at least a first direction and a second direction opposite to the first direction, wherein each level is designated for unidirectional travel.

Figure 9:
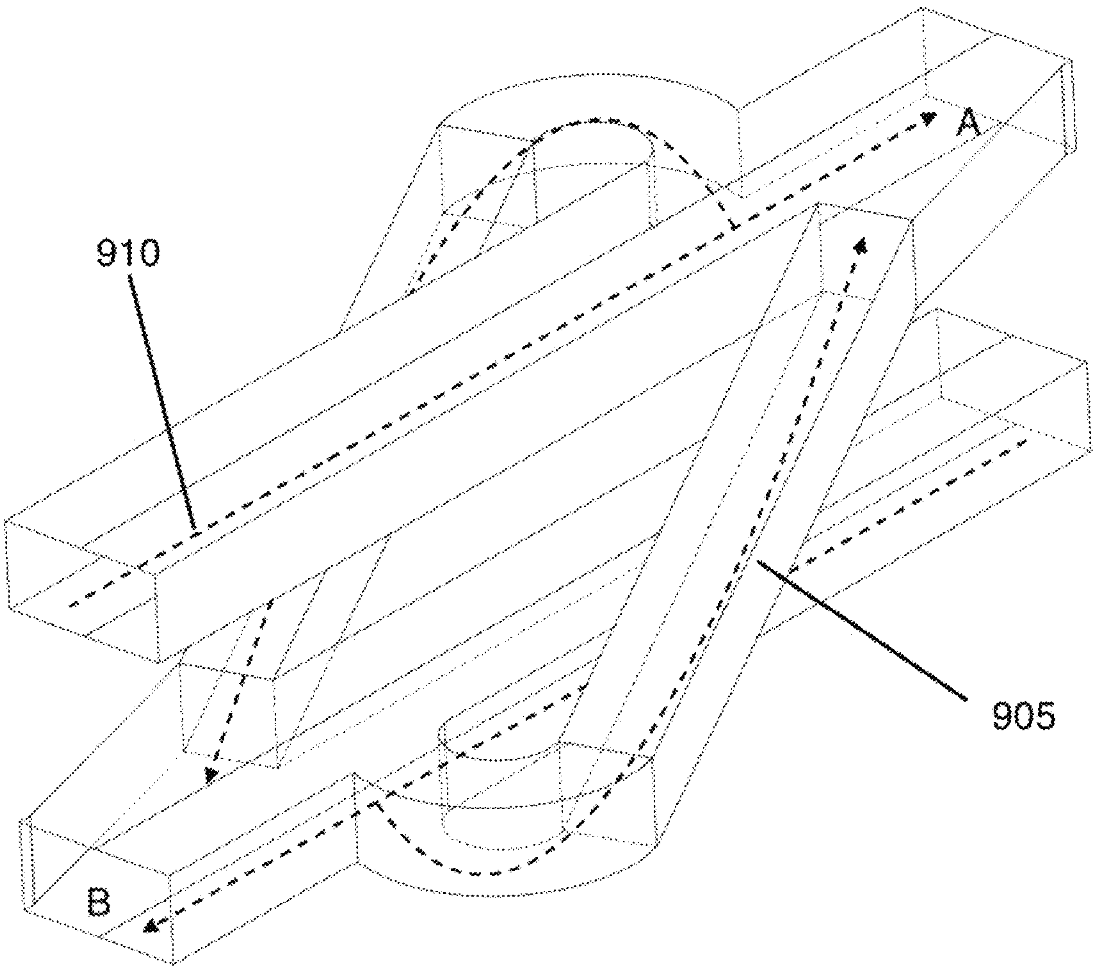
FIG. 9 depicts a side perspective view of a detailed enlargement of a single roadway used in the air highway systems disclosed herein, according to an aspect.

FIG. 9 depicts a side perspective view of a detailed enlargement of a single roadway used in the air highway systems disclosed herein, according to an aspect. FIG. 9 shows an example of an interconnecting ring road 910; however, it should be understood that intra-loop roads (such as the roads discussed when referring to at least FIG. 2) may be provided with a similar construction.

In some embodiments, each roadway 915 is divided into an upper level 915*a* allowing travel in the direction indicated by arrow A, and a lower level 915*b* allowing travel in the direction indicated by arrow B, such that the upper level and the lower level are each designated for one-way traffic. These levels accommodate travel in opposite directions and do not intersect. In some embodiments, the upper level and the lower level of each road are each approximately 165 feet high and approximately 165 feet wide. In some embodiments, interconnecting ring roads are provided with the upper level, the lower level, and the turning lanes as shown in FIG. 9. In some embodiments, intra-loop ring roads are provided with the upper level, the lower level, and the turning lanes as shown in FIG. 9.

The turning lanes 931 are designed to branch off from the original road to connect to the opposite direction lane, such as branching off from lower level 915*b* to connect to upper level 915*a*. Aerial vehicles that need to turn are able to do so via the arc-shaped turning lane 931 without stopping, and without affecting the travel of other vehicles. Generally, to merge from road 915*a* to road 915*b*, the aerial vehicles may merge into the outermost turn lane 931 in advance, enter the turn lane through the exit, and then merge into the other road 915*b* to travel in the direction indicated by arrow B. To ensure the smooth flow of the turn lane 931, the turning flying car should merge into the middle lane as early as possible to continue driving, rather than staying in the turn lane. The four different directions are designed to be stacked on top of each other depending on the direction and can be traveled in different directions by connecting the four lanes through the turn lanes.

Figure 10:
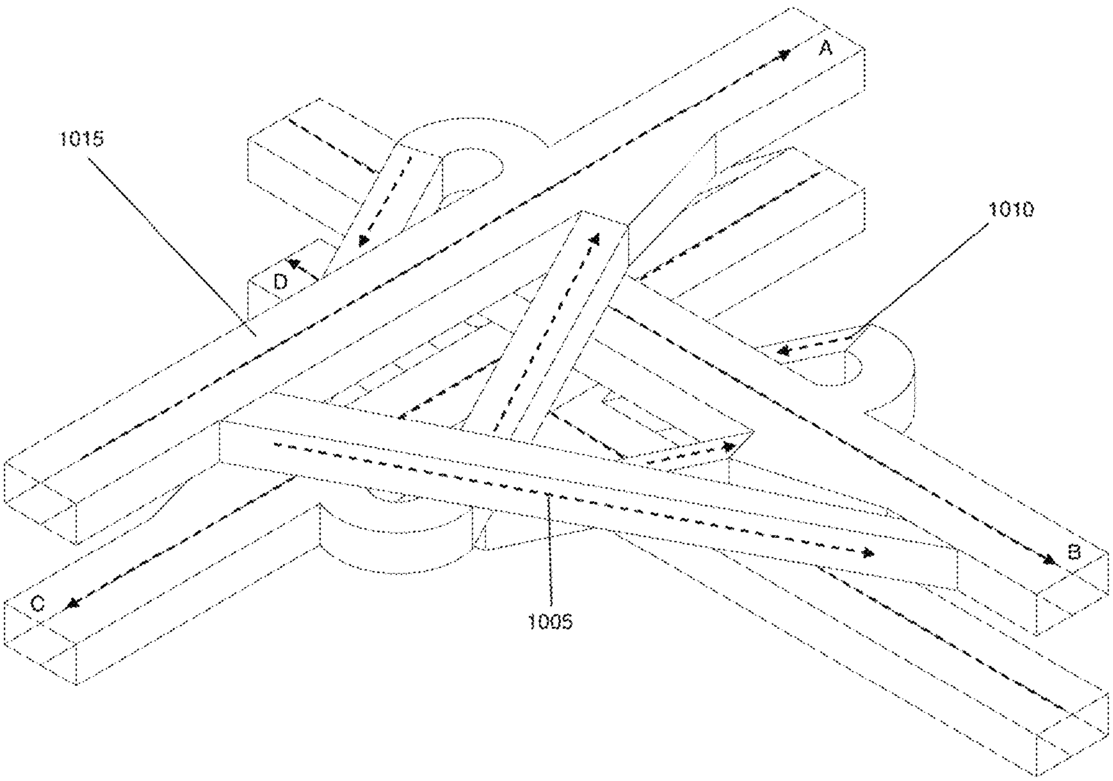
FIG. 10 depicts a top perspective view of a schematic diagram of a traffic hub of an air roadway system having at least three levels, according to an aspect.

FIG. 10 depicts a top perspective view of a schematic diagram of a traffic hub of an air roadway system, according to an aspect. Particularly busy areas of the air roadway system may be provided with turnaround roads and turnpike roads. Such traffic hubs may require a relatively large amount of space and thus can be placed in the center of large cities or between roads that connect in multiple directions. The hub connects four lanes 1015*a*, 1015*b*, 1015*c*, 1015*d* leading in cardinal directions, East (A), South (B), West (C) and North (D). The traffic hub is designed to avoid multiple consecutive roadway transitions to reduce the incidence of accidents. Since a flying car needs to cross the roadway after merging to make multiple changes in direction of travel, if it needs to adjust its direction of travel significantly, it can do so by entering the nearest loop for directional adjustment.

Generally, the air roadway systems provided herein may comprise turnpikes 1032 and turning lanes 1031 throughout the system, including within traffic hubs such as the hub depicted in FIG. 10, and also in other areas with less demand and activity, to allow access to all parts of the air roadway system. In some embodiments, turnpikes 1032 allow travel between a first road 1015*a* and a second road 1015*c* wherein the roads are perpendicular to each other, and turning lanes

1031, as described above when referring to FIG. 9, allow travel between an upper level 1015*c* and a lower level 1015*d* of a single road.

Traffic hubs may be utilized by cities or other areas with high traffic volumes that require frequent direction changes, or areas with complex road conditions that require more road space. In areas where traffic demand is not high and road conditions are not complex, turnpikes 1032 and turning lanes 1031 may be spaced further apart than in areas with higher traffic needs. In some embodiments, either a turn lane 1031 or a turnpike 1032 is provided at approximately every 5 miles. In some embodiments, turn lanes or turnpikes are provided at longer intervals. These two kinds of roads are provided alternatively to avoid accidents, but also to avoid the accidental entry into an incorrect lane or road, for example. Generally, the turnpikes and turning lanes provided in the air highway system may help to reduce risk of wrong turns that may occur in traditional road intersections, which can cause confusion for some drivers.

It should be understood that, for clarity of the drawings and of the specification, some or all details about some structural components or steps that are known in the art are not shown or described if they are not necessary for the invention to be understood by one of ordinary skills in the art.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH® networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled elements across the figures (e.g., 405 and 505, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A method of managing travel by aerial vehicles on an air roadway system, comprising:

designing the air roadway system, comprising a plurality of roads arranged in a grid, such that a first set of roads is arranged perpendicular to a second set of roads, and wherein each road comprises an upper level allowing travel by the aerial vehicles in a first direction, and a lower level allowing travel in a second direction opposite to the first direction;

providing a static route planning model for creating fixed routes for each individual aerial vehicle of the aerial vehicles, wherein the fixed routes are created according to an arrival point and a destination point of a user of an aerial vehicle;

determining the fixed routes for each one of the individual aerial vehicles such that each one of the aerial vehicles follow a received fixed route, wherein the fixed routes are designed to provide minimal interruptions and reduce risk of collisions during travel without intersecting other aerial vehicles on the air roadway system;

designating the air roadway system for use by travel according to the routes created by the static route planning model;

providing the routes to the aerial vehicles traveling on the air roadway system;

providing a plurality of loop systems, each loop system being designated for entry and exit into an area of interest by the aerial vehicles, and comprising an ascending loop allowing travel in an upwards direction, and a descending loop allowing travel in a downwards direction; wherein the ascending loop and the descending loop are arranged in a spiral wrapping around each other without intersecting each other, such that the ascending loop and the descending loop together form a cone shape; and monitoring the air roadway system to re-plan the routes or perform road closure in case of emergencies or severe weather conditions;

wherein turnpikes connect the first set of roads to the second set of roads to allow travel between the first set of roads and the second set of roads; and wherein turning lanes connect the upper level and the lower level of each road to allow travel between the upper level and the lower level.

2. The method of claim 1, wherein the ascending loop and the descending loop each comprise entry points and exit points at a ground level, at least a center level, and a top level, wherein the entry points and exit points of the at least a center level and the top level allow access to the plurality of roads and the entry points and exit points of the ground level allow access to the area of interest.

3. The method of claim 1, wherein travel between the plurality of loop systems is accessible via interconnecting ring roads of the plurality of roads.

4. The method of claim 1, wherein the roads comprise at least a first lane, a second lane, and a third lane, and wherein the second lane is centered between the first lane and the third lane and designated to be free of travel to provide a safety barrier between the first lane and the third lane.

5. The method of claim 1, further comprising providing a management system for the monitoring step, wherein the management system is capable of creating the routes and making adjustments to the routes created by the static route planning model, and performing road closures in the case of emergencies or severe weather conditions.

6. The method of claim 1, further comprising providing a plurality of landing areas for take-off and landing by the aerial vehicles, wherein each landing area comprises access roads for travel to the plurality of roads.

7. The method of claim 1, wherein each landing area comprises a vertical column designated for vertical take-off and landing by the aerial vehicles.

8. The method of claim 6, wherein the access roads provide travel in at least cardinal directions north, south, east, and west.

9. The method of claim 1, wherein the upper level and the lower level of each road are each 165 feet high and 165 feet wide.

10. The air roadway system of claim 1, further comprising a plurality of landing areas for take-off and landing by the aerial vehicles, wherein each landing area comprises access roads for travel to the plurality of roads.

11. The air roadway system of claim 10, wherein each landing area comprises a vertical column designated for vertical take-off and landing by the aerial vehicles.

12. An air roadway system for use by aerial vehicles, comprising:

a plurality of roads designated for travel by the aerial vehicles following fixed routes created by a static route planning model, wherein the plurality of roads is arranged in a grid, such that a first set of roads is arranged perpendicular to a second set of roads, and wherein each road comprises an upper level allowing travel by the aerial vehicles in a first direction, and a lower level allowing travel in a second direction that is opposite to the first direction; and a plurality of loop systems designated for entry and exit into areas of interest, comprising an ascending loop and a descending loop, wherein the ascending loop and the descending loop wrap around each other in a spiral without intersecting, such that the ascending loop and the descending loop together form a cone shape, and allow rotational travel in a vertical direction, and wherein the ascending loop and the descending loop each comprise entry points and exit points at a ground level, at least a center level, and a top level, wherein the entry points and exit points of the at least a center level and the top level allow access to the plurality of roads and the entry points and exit points of the ground level allow access to the areas of interest;

wherein turnpikes connect the first set of roads to the second set of roads to allow travel between the first set of roads and the second set of roads; and wherein turning lanes connect the upper level and the lower level of each road to allow travel between the upper level and the lower level; and wherein the fixed routes are created according to an arrival point and a destination point of a user of an aerial vehicle, and wherein each one of the individual aerial vehicles follow a received fixed route, wherein the fixed routes are designed to provide minimal interruptions and reduce risk of collisions during travel for each one of the individual aerial vehicles without intersecting other aerial vehicles on the air roadway system.

13. The air roadway system of claim 12, further comprising a management system for monitoring the air roadways, capable of creating the routes and making adjustments to the routes created by the static route planning model, and performing road closures in the case of emergencies or severe weather conditions.

14. The air roadway system of claim 12, wherein the roads comprise at least a first lane, a second lane, and a third lane, and wherein the second lane is centered between the first lane and the third lane and designated to be free of travel to provide a safety barrier between the first lane and the third lane.

15. The air roadway system of claim 12, wherein the upper level and the lower level of each road are each 165 feet high and 165 feet wide.

16. A method for enabling take-off and landing of aerial vehicles on an air roadway system, comprising:

providing a static route planning model for creating routes for each individual aerial vehicle of the aerial vehicles, wherein the fixed routes are created according to an arrival point and a destination point of a user of an aerial vehicle;

determining the fixed routes for each one of the individual aerial vehicles such that each one of the aerial vehicles follow a received fixed route, wherein the fixed routes are designed to provide minimal interruptions and reduce risk of collisions during travel without intersecting other aerial vehicles on the air roadway system;

providing the routes to the aerial vehicles traveling on the air roadway system;

providing a loop system designated for entry and exit into an area of interest by the aerial vehicles, the loop system comprising an ascending loop allowing travel in an upwards direction, and a descending loop allowing travel in a downwards direction; wherein the ascending loop and the descending loop are arranged in a spiral wrapping around each other without intersecting each other; wherein the ascending loop and the descending loop each comprise entry points and exit points at a ground level, at least a center level, and a top level, wherein the entry points and the exit points of the at least a center level and the top level allow access to the plurality of roads and the entry points and the exit points of the ground level allow access to the area of interest;

allowing landing of the aerial vehicles on the ground level within the descending loop; and allowing take-off of the aerial vehicles on the ground level within the ascending loop.

17. The method of claim 16, wherein the top level is wider than the ground level of each of the ascending loop and the descending loop.

18. The method of claim 16, wherein the entry points and the exit points provide travel in at least cardinal directions north, south, east, and west.

19. The method of claim 16, wherein the landing and the take-off of the aerial vehicles on the ground level comprise vertical landing and vertical take-off.

* * * * *